United States Patent Office 3,350,356
Patented Oct. 31, 1967

3,350,356
1-CHLORO-2-CHLOROCARBONATOBUTANONE-3
AND PROCESS FOR POLYMERIZATION
Charles H. Schramm and Morris Zief, Easton, Pa., assignors to J. T. Baker Chemical Company, Phillipsburg, N.J., a corporation of New Jersey
No Drawing. Filed June 26, 1964, Ser. No. 378,448
4 Claims. (Cl. 260—63)

ABSTRACT OF THE DISCLOSURE

Process for preparing a novel solid resin by reacting butanedione with phosgene in the presence of dehydrochlorination, e.g., triethylamine, acid acceptor. Also preparation of novel compound 1-chloro-2-chlorocarbonatobutanone-3. The resins are useful as potting and encapsulating applications where high temperature stability is advantageous. The novel compound can be dehydrochlorinated to prepare a polycarbonate resin.

---

This invention relates to novel compounds and polymers derived from the reaction of butanedione and phosgene. In a particular aspect this invention relates to 1-chloro-2-chlorocarbonatobutanone-3 which is useful as an intermediate in the production of other organic compounds and polycarbonate resins.

It has been discovered that 1-chloro-2-chlorocarbonatobutanone-3 can be produced by a process which comprises reacting butanedione with phosgene:

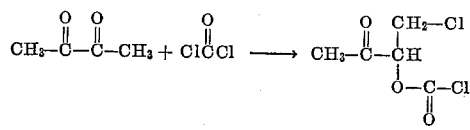

The reaction is preferably conducted in an inert organic solvent medium such as benzene, toluene, ethyl acetate, tetrahydrofuran, chloroform, and the like. Butanedione and phosgene can be reacted in proportions ranging between about 0.5 and 5 moles of phosgene per mole of butanedione.

Dehydrochlorination of 1-chloro-2-chlorocarbonatobutanone-3 with a strong base, preferably an organic base such as triethylamine or alkali metal alkoxide, produces in situ a polymeric product.

While not wishing to be bound by any particular theory or mechanism, it is believed that the resins are derived from a polymerizable carbonyldioxybutadiene dehydrochlorination derivative having the structure:

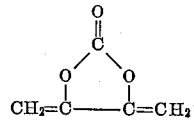

Polymers are also produced directly when butanedione and phosgene are reacted together in the presence of a dehydrochlorination acid acceptor such as triethylamine.

The polymers of the present invention resemble polycarbonate resins in their properties and are useful in potting and encapsulating applications wherein high temperature stability is advantageous.

The following examples illustrate particular embodiments of the present invention.

Example 1.—Preparation of 1-chloro-2-chlorocarbonatobutanone-3

A solution of phosgene (19.8 grams, 0.2 mole) in 80 milliliters of toluene was added to butanedione (17.2 grams, 0.2 mole) in 40 milliliters of pyridine at a temperature of 0° C.

The reaction mixture was allowed to stand overnight at room temperature. The precipitate which formed was filtered off and the filtrate was fractionally distilled. Nine grams (24.3 percent yield) of 1-chloro-2-chlorocarbonatobutanone-3 was obtained, melting point 88–90° C. This compound was soluble in chloroform, ethyl acetate, and ethanol and was insoluble in water. Elemental analysis and infrared spectra were consistent with the assigned structure.

Reaction of 1-chloro-2-chlorocarbonatobutanone-3 with 2,4-dinitrophenylhydrazine yielded a halogen-free derivative with a melting point above 330° C., presumably having as one isomeric structure:

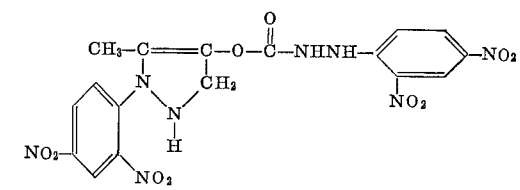

Analysis.—Calc. for $C_{17}H_{14}N_8O_{10}$: C, 41.85; H, 2.85; N, 22.8. Found: C, 42.19; H, 2.88; N, 22.26; Cl, 0.0.

Treatment of 1-chloro-2-chlorocarbonatobutanone-3 with a strong base such as triethylamine yields a halogen-free resin product.

Example 2

A solution of phosgene (19.8 grams, 0.2 mole) in 80 milliliters of toluene was added to butanedione (17.2 grams, 0.2 mole) in triethylamine (50.9 grams, 0.9 mole). The reaction mixture was allowed to stand overnight at room temperature. The precipitate which formed was filtered off (49 grams). The filtrate was refluxed and an additional 3 grams of precipitate were collected.

The filtrate recovered from the second filtration was distilled to remove solvent and other volatile components of the mixture. A solid resinous pot residue was recovered which was insoluble in ethyl ether, ethanol and water, and was soluble in acetone. After extraction with hot ethyl ether, the solid residue was dissolved in acetone and precipitated by the addition of petroleum ether.

What is claimed is:
1. 1-chloro-2-chlorocarbonatobutanone-3.
2. A process for producing a solid resin which comprises contacting in an inert organic solvent butanedione with phosgene, in a molar ratio of about 1 mole of phosgene per mole of butanedione, and in the presence of a dehydrochlorination acid acceptor.
3. A process for producing a solid resin which comprises contacting 1-chloro-2-chlorocarbonatobutanone-3 with a dehydrochlorination acid acceptor, said acid acceptor being an organic base selected from the group consisting of triethylamine or an alkali metal alkoxide.
4. A resin prepared by the process of claim 2.

References Cited
UNITED STATES PATENTS
3,213,062  10/1965  Ellingboe et al. _____ 260—63

WILLIAM H. SHORT, Primary Examiner.

L. LEE, Assistant Examiner.